Oct. 27, 1942.   J. STUART, 3D   2,300,268
AIRPLANE
Filed Jan. 11, 1940   2 Sheets-Sheet 1

INVENTOR
JOSEPH STUART III
BY Ernest M. Symmes
ATTORNEY

Oct. 27, 1942.  J. STUART, 3D  2,300,268
AIRPLANE
Filed Jan. 11, 1940  2 Sheets-Sheet 2

INVENTOR
JOSEPH STUART III
BY Ernest M. Symmes
ATTORNEY

Patented Oct. 27, 1942

2,300,268

UNITED STATES PATENT OFFICE 2,300,268

AIRPLANE

Joseph Stuart, III, Wilmington, Del.

Application January 11, 1940, Serial No. 313,332

7 Claims. (Cl. 244—7)

This invention relates to aircraft, and more particularly to aircraft adapted to rise vertically and then level off to horizontal flight.

The main disadvantage of airplanes has been the high speeds necessary for landing, and the large, level ground area necessary for landing and take-off. Attempts have been made heretofore to avoid this difficulty by the use of helicopter and autogyro types of aircraft, but the disadvantage has not been overcome to any appreciable extent.

The helicopter suffers from the great disadvantage of being supported solely by the propeller, thus causing very low efficiencies in horizontal flight at high speeds.

The autogyro also suffers from the disadvantage of very low efficiencies at high horizontal speeds, large and unwieldy rotor, and inability to climb vertically or to hover.

One of the objects of my invention is to provide an aircraft not of the known helicopter or autogyro type, but one capable of ascending vertically from the ground, then operating as an ordinary airplane, and finally descending vertically.

Another object of my invention is the provision of improved means of control of my aircraft by means of tilting the propeller axis, in addition to normal airplane control.

Another object of my invention is the provision of a cushioned landing device for vertical descent in case of power failure.

Further objects and advantages of my invention will appear in the following specification and accompanying drawings.

Figures 1, 2:
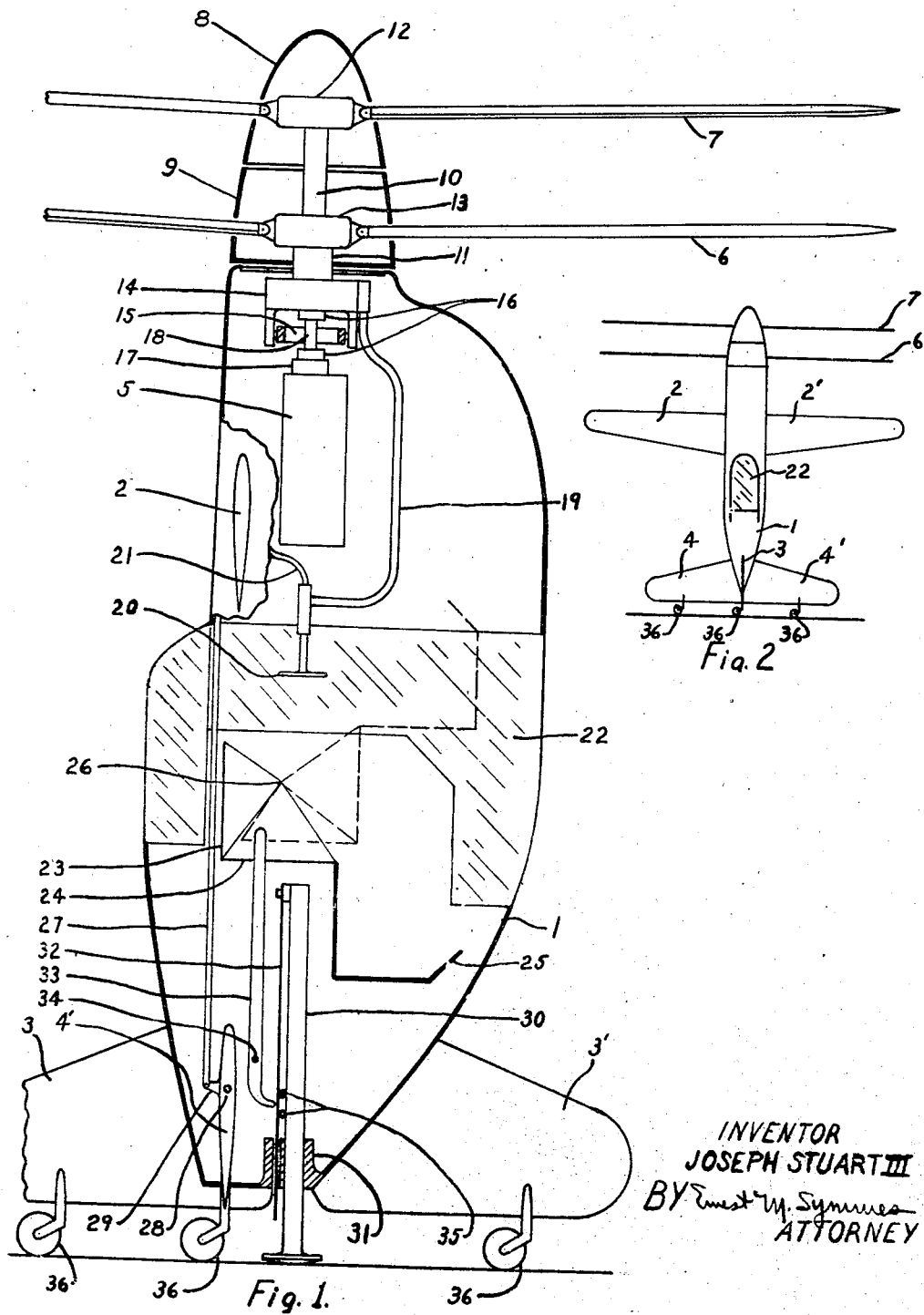
Figure 3:
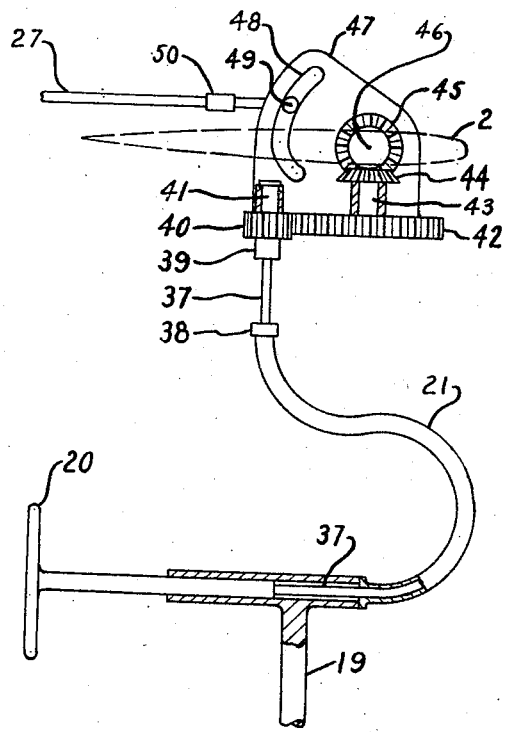
Figure 4:
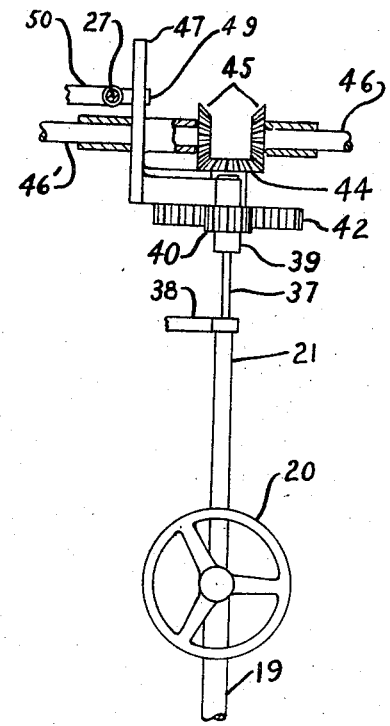
Figure 5:
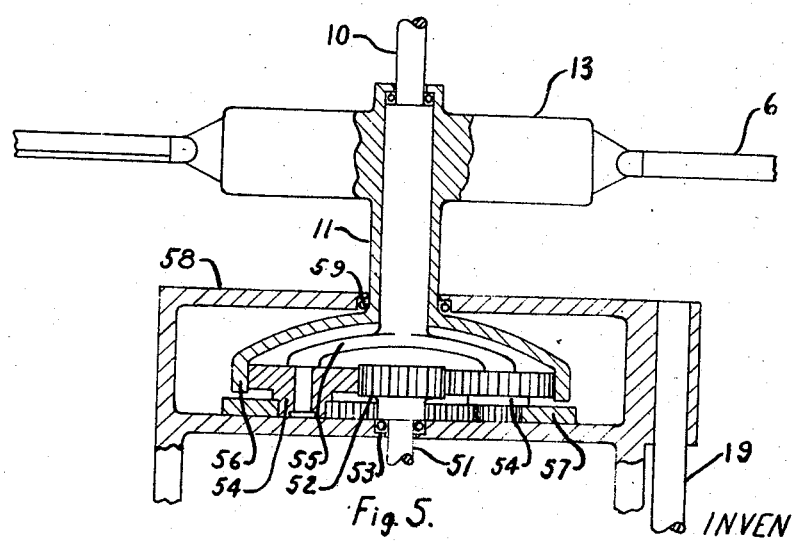

As an example of the construction of an aircraft embodying my invention, reference is made to the accompanying drawings, in which Figure 1 represents, in part, a sectional view along the center line, Figure 2 a general view of said aircraft standing vertically, Figures 3 and 4 details of control mechanism of said aircraft, and Figure 5 a gear drive between engine and propeller system.

Referring now particularly to Figure 1 of the accompanying drawings, 1 represents the body of the aircraft, 2' a wing of said aircraft, 3, 3' vertical tail surfaces of said aircraft, 4, 4' horizontal tail surfaces thereof, 5 the engine driving the propeller system, 6, 7 controllable-pitch, preferably hinged propellers, 8 the outboard spinner, 9 the inboard spinner, 10 the outboard propeller drive shaft, 11 the inboard propeller drive shaft, 12 the outboard propeller hub, 13 the inboard propeller hub, 14 the propeller drive gear, 15 a gimbal mounting pivoting the propeller system about the center of said gimbal mounting relative to the body of the air-craft, 16 universal joints, 17 an over-running clutch, 18 a coupling shaft, 19 a propeller control bar, 20 a control wheel, 21 a flexible conduit containing a flexible shaft, 22 unbreakable, transparent, observation windows, 23 the back of the pilot's seat, 24 the seat of the same, 25 the footrest of the same, all pivoted on pivot 26, 27 a horizontal tail surface push rod, 28 a horizontal tail surface pivot, 29 a horizontal tail surface control horn, 30 an emergency shock absorption strut, operating in and through bearing bushing 31, said shock absorption strut carrying metallic strip 32 also passing through bushing 31 and adapted for braking the motion of strut 30, 33 a clamping lever operating on pivot 34, in conjunction with fixed pins 35, and landing wheels 36. Propellers 6, 7 are controlled in pitch by known means, not shown, by the pilot.

Referring now particularly to Figure 3, 20 represents a control wheel, 19 a propeller control bar, 37 a flexible shaft, 38 a bracket secured to the body of the aircraft, 39 a universal joint, 40 a pinion carried on shaft 41, 42 a spur gear carried on shaft 43, 44 a bevel gear driven by shaft 43, 45 a driven bevel gear driving shaft 46, 47 a floating frame containing cam slot 48, in which is positioned follower pin 49 actuating horizontal surface push rod 27, supported in bracket 50, also attached to the aircraft body.

Referring now particularly to Figure 4, this shows another view of the device of Figure 3, making clear how bevel gear 44 operates to drive both bevel gears 45 in opposite directions and consequently shafts 46, 46' in opposite directions.

Referring now particularly to Figure 5, which was represented in part, diagrammatically, in Figure 1 by 14, 51 is a driving shaft, driving pinion 52 supported in bearing 53, said pinion 52 driving planetary pinions 54, which latter are comprised of two sets of teeth of different diameters, carried on spider 55, which latter is integral with shaft 10, said planetary pinions 54 driving by their larger diameter ring gear 56, which latter is integral with shaft 11, the smaller toothed part of pinions 54 meshing with fixed ring gear 57, attached to casing 58, carrying bearing 59 and control bar 19.

Broadly, the operation of my improved aircraft is as follows: With the aircraft in the vertical position on the ground, as shown in Figures 1 and 2, and the pilot sitting in the pivot seat shown, engine 5 is suitably started and power applied to the dual propeller system via gear mechanism 14, shown more particularly in Figure 5. Propellers 6, 7 rotate in opposite directions. On increasing the power output of the engine, sufficient thrust is developed to lift the aircraft vertically off the ground. During the vertical flight, control is obtained principally by tilting the propeller system via bar 19 through lateral motion of wheel 20. Any residual or external torque tending to spin the aircraft about its longitudinal axis is counterbalanced by the pilot by differentially setting wings 2, 2' by rotation of wheel 20.

On reaching a sufficient altitude, bar 19 is tilted by the pilot to cause the aircraft to tend to assume normal airplane level flight position, assisted, if desired, by axial motion of wheel 20, acting to tilt wings 2, 2'. In such normal, horizontal airplane flight, the pilot's seat will assume the position shown by the dotted lines in Figure 1. In normal, horizontal flight, control is by conjoint or separate angle shift of wings 2, 2', effected by wheel 20. I hereinafter designate wing and tail surfaces as non-rotating air foils.

When in horizontal flight, in order to land, the aircraft is so controlled by the pilot as to assume a vertical position, by suitable control of the wings and by axis tilt of the propeller system, the power output of the engine being so adjusted as to allow the aircraft slowly to descend vertically and alight on the ground on landing wheels 36.

In event of power failure, the pilot will nose up the aircraft, by action of the wing controls, into an approximately vertical position, then slow the propeller system, by adjusting the pitch of the propellers, if necessary, in order to ensure the presence of some thrust from the propeller system until the equilibrium settling velocity and thrust-weight equilibrium have developed, and the propeller system, freed from engine drag by the over-running clutch 17, acts as an autogyro propeller system to support the aircraft in its vertical descent. This procedure permits the pilot to control the aircraft via control bar 19 throughout the period that the wing controls are ineffective.

Nevertheless, in such a case a relatively high settling velocity will ensue, which may be cushioned by a shock absorbing mechanism of long travel, in order to safeguard the aircraft and occupants. Such is accomplished, for example, by a shock absorbing mechanism comprising strut 30, strut-restraining strip 32, clamping lever 33 and fixed pins 35. The pilot, by clamping and deforming strip 32 between the anvil of lever 33 and pins 35, sets up the necessary high resistance to the motion of strut 30 required for the absorption of the shock of the descending motion.

During the final stages of vertical descent with power failure, the pilot may, if desired, increase the propeller pitch angle of the rapidly-rotating propellers, in order to bring about a temporary increase in thrust, acting to decelerate the vertical descent of the aircraft. This procedure, may, in variations of my invention, permit reduction in size or elimination of the cushioned landing strut shown in the drawings.

The above-described, power-on, vertical descent pre-supposes still air. In case of power-on vertical descent in a wind it is desirable that the air craft be given a lateral motion (in relation to the wind) while in a vertical position. This is accomplished by the pilot setting the wing at an angle to the vertical, thus accomplishing true vertical descent relative to the ground.

Referring again to Figures 3 and 4, it will be noted that wheel 20 is connected to flexible shaft 37, housed in flexible conduit 21, secured at its outboard end to the aircraft body by bracket 38. Flexible shaft 37 is of such construction that it will transmit axial and rotational motion of control wheel 20 to universal joint 39, the rotational motion of which is transmitted to pinion 40 and the axial motion of which acts to rotate frame 47 relative to the body of the aircraft about the axes of shafts 46. Rotation of pinion 40, as described, acts to impart rotation to gear 42, shaft 43 and bevel gear 44, which, in turn, rotates bevels 45 in opposite directions, thereby differentially tilting wings 2, 2'.

Rotation of frame 47, as described, acts to turn shafts 46 in the same direction, thereby tilting wings 2, 2' each through the same angle in the same direction. Motion of frame 47 may cause cam slot 48 to impart motion to push rod 27 via cam follower 49, thus acting to cause tilting of the tail surface to an angle.

Referring again to Figure 5, it will be noted that this gear drive operates to rotate propellers 6, 7 in opposite directions at fixed velocity ratios and incorporates a speed reduction relative to the speed of shaft 51. If desired, I may use in my improved aircraft, a gear mechanism somewhat similar to that shown in Figure 5, but in which ring gear gear 57 and smaller toothed parts of 54 are omitted, thus obtaining a gear mechanism incorporating a substantial reduction in speed relative to shaft 51 and at the same time a predetermined torque balance between propellers 6, 7.

I do not limit myself to the exact construction shown in the drawings and specification, but I may substitute known equivalents for the various means shown in the preferred embodiment of my invention, without departing from the spirit of my invention.

What I claim is:

1. In an aircraft adapted to ascend and descend vertically and fly horizontally, the combination of an elongated body, wing surfaces extending transversely of and attached to said body, said wing surfaces including pilot-operated means of varying the aerodynamic actions of said wing surfaces, a gimbal mounting at the forward end of said body, a dual propeller system mounted in said gimbal mounting and pivoting therein by pilot control relative to the longitudinal axis of said body, said pilot control comprising a unitary pilot device acting upon both propeller system tilt and wing aerodynamic actions, an engine driving said propeller system, planetary gearing driven by said engine and driving said propellers in opposite directions at speeds less than engine speed, and a landing gear secured to the after part of said aircraft body and adapted to support said body with its longitudinal axis in a substantially vertical position while the aircraft is on the ground and to cushion the shock of said aircraft while landing.

2. In an aircraft adapted to ascend and descend vertically and fly horizontally, the combination of an elongated body, tail surfaces secured to the after part of said body, wing surfaces extending transversely of and attached to said body, said wing surfaces including pilot-operated means of varying the aerodynamic actions of said wing surfaces, a gimbal mounting at the forward end of said body, a dual propeller system mounted in said gimbal mounting and pivoting therein by pilot control relative to the longitudinal axis of said body, said pilot control comprising a unitary device acting upon both propeller system tilt and wing aerodynamic action, an engine driving said propeller system, planetary gearing driven by said engine and adapted to drive said propellers in opposite directions at speeds less than engine speed and at fixed torque ratio between the two propellers, and a landing gear secured to the after end of said aircraft and adapted to support said body with its longitudinal axis substantially vertical while the aircraft is on the ground and to cushion the shock of said aircraft while landing.

3. In an aircraft adapted to ascend and descend vertically and fly horizontally, the combination of an elongated body, tail surfaces secured to the after part of said body, wing surfaces extending transversely of and attached to said body, said wing surfaces being mounted fixedly on a shaft extending transversely of said body and adapted to rotate by pilot control to vary the aerodynamic actions transmitted from said wing surfaces to said body, a gimbal mounting at the forward end of said body, a dual propeller system mounted in said gimbal mounting and pivoting therein by pilot control relative to the longitudinal axis of said body, said pilot control comprising a unitary device acting upon both propeller system tilt and wing aerodynamic action, a pilot seat pivoted to remain upright in both hovering and level flight, an engine driving said propeller system, planetary gearing driven by said engine and adapted to drive said propellers in opposite directions at speeds less than engine speed and at fixed torque ratio between the two propellers, and a landing gear secured to the after part of said aircraft and adapted to support said body with its longitudinal axis substantially vertical while the aircraft is on the ground and to cushion the shock of said aircraft while landing.

4. In an aircraft adapted to ascend and descend vertically and fly horizontally, the combination of an elongated body, tail surfaces secured to the after part of said body, wing surfaces extending transversely of and attached to said body, said wing surfaces being mounted fixedly on a shaft extending transversely of said body and adapted to rotate by pilot control to vary the aerodynamic actions transmitted from said wing surfaces to said body, a gimbal mounting at the forward end of said body, a dual propeller system mounted in said gimbal mounting and pivoting therein by pilot control relative to the longitudinal axis of said body, said pilot control comprising a unitary pilot device adapted to control simultaneously both propeller system tilt and wing aerodynamic actions, a pilot seat pivoted to remain upright in both hoving and level flight, an engine driving said propeller system, planetary gearing driven by said engine and adapted to drive said propellers in opposite directions at speeds less than engine speed and at fixed torque ratio between the two propellers, and a landing gear secured to the after part of said aircraft and adapted to support said body with its longitudinal axis substantially vertical while the aircraft is on the ground and to cushion the shock of said aircraft while landing.

5. In an aircraft adapted to ascend and descend vertically and fly horizontally, the combination of an elongated body, tail surfaces secured to the after part of said body, wing surfaces extending transversely of and attached to said body, said wing surfaces being mounted fixedly on a shaft extending transversely of said body and adapted to rotate by pilot control to vary the aerodynamic actions transmitted from said wing surfaces to said body, a gimbal mounting at the forward end of said body, a dual propeller system mounted in said gimbal mounting and pivoting therein by pilot control relative to the longitudinal axis of said body, said propeller system including dual, co-axial, hinged-blade, controllable-pitch propellers, said pilot control comprising a unitary pilot device adapted to control simultaneously both propeller system tilt and wing aerodynamic actions, a pilot seat pivoted to remain upright in both hovering and level flight, an engine driving said propeller system, planetary gearing driven by said engine and adapted to drive said propellers in opposite directions at speeds less than engine speed and at fixed torque ratio between the two propellers, and a landing gear secured to the after part of said body and adapted to support said body with its longitudinal axis substantially vertical while the aircraft is on the ground and to cushion the shock of said aircraft while landing, said cushioning action being pilot-controlled.

6. In an aircraft adapted to ascend and descend vertically and fly horizontally, the combination of an elongated body, wing surfaces extending transversely of and attached to said body, said wing surfaces including pilot-operated means of varying the aerodynamic actions of said wing surfaces, a gimbal mounting at the forward end of said body, a dual propeller system mounted in said gimbal mounting and pivoting therein by pilot control relative to the longitudinal axis of said body, said pilot control comprising a unitary device acting upon both propeller system tilt and wing aerodynamic action, an engine driving said propeller system, planetary gearing driven by said engine and driving said propellers in opposite directions at speeds less than engine speed and at fixed velocity ratios between the propellers, and a landing gear secured to the after end of said aircraft and adapted to support said body with its longitudinal axis substantially vertical while the aircraft is on the ground and to cushion the shock of said aircraft while landing.

7. In an aircraft adapted to ascend and descend vertically and fly horizontally, the combination of an elongated body, tail surfaces secured to the after part of said body, wing surfaces extending transversely of and attached to said body, said wing surfaces including pilot-operated means of varying the aerodynamic actions of said wing surfaces, a gimbal mounting at the forward end of said body, a dual propeller system mounted in said gimbal mounting and pivoting therein by pilot control relative to the longitudinal axis of said body, said pilot control comprising a unitary device acting upon both propeller system tilt and wing aerodynamic action, an engine driving said propeller system, an over-running clutch between said engine and said propeller system, planetary gearing driven by said engine and adapted to drive said propellers in opposite directions at speeds less than engine speed and at fixed velocity ratios between the propellers, and a landing gear secured to the after part of said aircraft and adapted to support said body with its longitudinal axis substantially vertical while the aircraft is on the ground and to cushion the shock of said aircraft while landing.

JOSEPH STUART, III.